March 4, 1941.  B. H. TICKNOR, 2D., ET AL  2,233,652
HOPPER AND FEEDING DEVICE
Filed Oct. 6, 1939  2 Sheets-Sheet 1
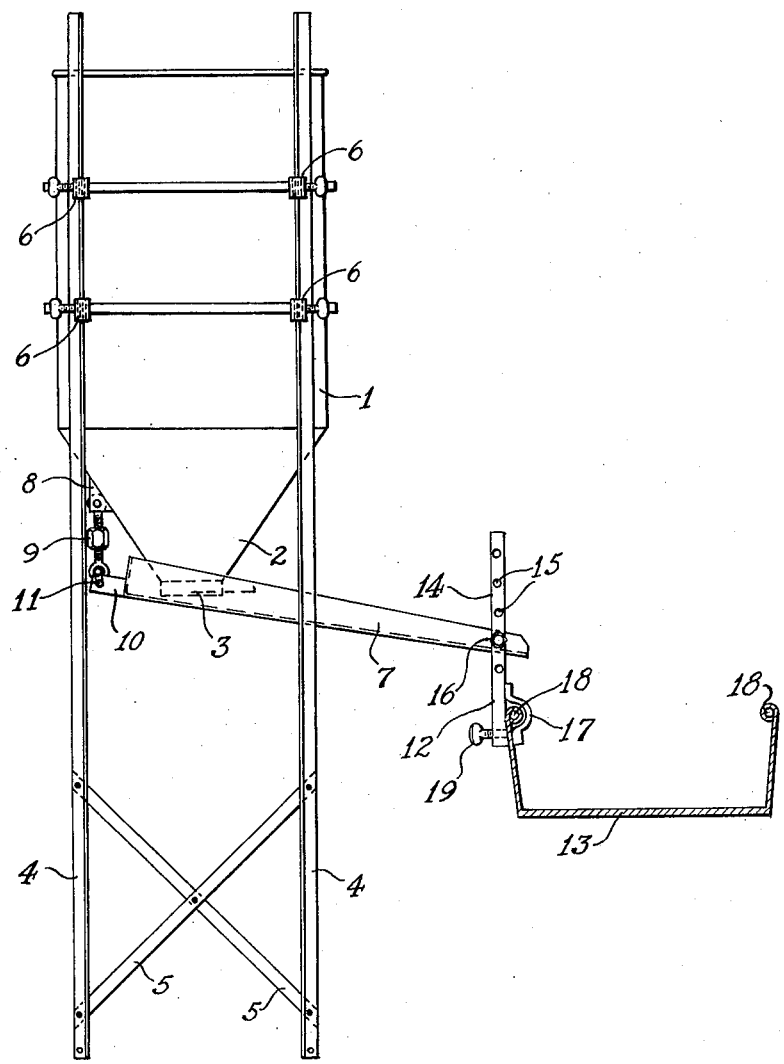
Fig. I
Benjamin H. Ticknor II
Arnold M. Talbott.
Inventors
By Francis M. Crawford
Attorney March 4, 1941.   B. H. TICKNOR, 2D., ET AL   2,233,652
HOPPER AND FEEDING DEVICE
Filed Oct. 6, 1939    2 Sheets-Sheet 2
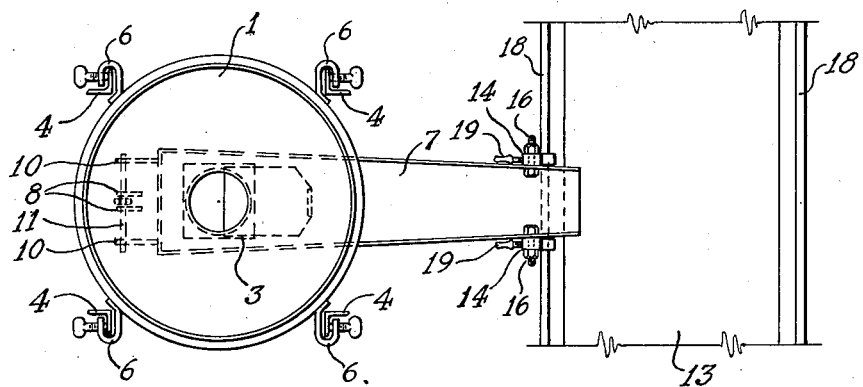
Fig. II
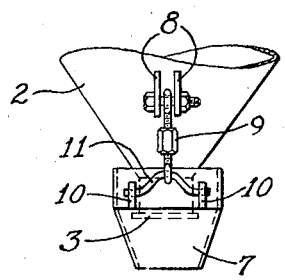
Fig III
Benjamin H. Ticknor II
Arnold M. Talbott.
Inventors
By Francis M. Crawford.
Attorney Patented Mar. 4, 1941

2,233,652

UNITED STATES PATENT OFFICE 2,233,652

HOPPER AND FEEDING DEVICE

Benjamin H. Ticknor, II, Englewood, N. J., and Arnold M. Talbott, Rye, N. Y., assignors to Commercial Molasses Corporation, New York, N. Y., a corporation of Delaware Application October 6, 1939, Serial No. 298,286

4 Claims. (Cl. 198—56)

Our invention relates to a hopper and feeding device for comminuted material, and more especially to such a device which is adapted to co-operate with a second feeding device having a vibrating feeding member.

An object of our invention is to provide a hopper and feeding device for comminuted materials, such as dry animal feeds, which is adapted to co-operate with a second feeding device to admix such comminuted material with material passing through the second feeding device.

Another object of our invention is to provide a hopper and feeding device of the type described above, having a vibrating feed chute adapted to receive its vibratory motion from the second feeding device with which it co-operates.

A still further object of our invention is to provide a hopper and feeding device of the type described above, which is sufficiently adjustable to be readily adapted for use in conjunction with existing types of equipment for handling animal foodstuffs, and especially forage cutters.

An additional object of our invention is to provide a hopper and feeding device for dry comminuted animal foodstuffs, adapted for use in conjunction with a forage cutter, and including adjustable members to insure proper co-operation with such forage cutter, and to provide adequate control of the flow of comminuted foodstuff.

Other objects and advantages of our invention will be apparent from the following description:

Our invention comprises, briefly, an open-top hopper adjustably mounted on a supporting standard, and having at the bottom thereof an adjustable discharge opening adapted to discharge material into a pivotally mounted feed chute, the discharge end of said feed chute being provided with adjustable means for mounting said chute in feeding relationship to a vibrating feeding member of a second feeding device.

Our invention will be more specifically described with reference to a preferred modification, which is illustrated in the accompanying drawings. In these drawings Figure I is a front elevational view of our hopper and feeding device, together with a partial sectional view of the feeding trough of an ensilage cutter, with which this device is adapted to co-operate. Figure II is a top or plan view corresponding in all respects to Figure I. Figure III is a partial side elevational view.

In the modification illustrated in the drawings, the hopper 1 is an open-top cylindrical vessel which may suitably comprise the side-wall portion of a standard steel shipping drum, and which is suitably fitted with a conical bottom 2 equipped with an adjustable discharge valve 3. Any suitable type of discharge valve capable of controlling the flow of dry comminuted material may be used for this purpose, as, for example, the simple slide valve represented in the drawings. The hopper is provided with a supporting standard which may suitably comprise a number of upright members 4, secured by bracing members 5. Adjustable mounting members 6 are provided to secure the hopper 1 to the vertical members 4 at the desired position. Any suitable mounting devices may be employed for this purpose, depending upon the nature of the vertical members 4. These members are desirably formed of angle iron, as illustrated in the drawings, in which case the mounting members 6 may suitably comprise C-clamps, affixed to the hopper 1 and positioned around and in clamping relationship to one side of the angle iron of the upright members 4. If the hopper 1 is formed from the standard type of shipping drum, the clamping members 6 may suitably be welded to the rolling hoops of the drum, as illustrated in the drawings.

Below the discharge port 3 of the hopper, and in suitable relationship to receive comminuted material therefrom, is positioned a feed chute 7 which is pivotally mounted to provide adjustment of the rate of flow of comminuted material down the chute. The pivotal mounting means for the chute 7 preferably provides for adjustment of the vertical spacing of the discharge end of said chute from the discharge port 3 of the hopper. This can be accomplished by providing adjustable positioning means for the pivotal mounting on the upright members 4 of the supporting standard, but is more desirably provided by attaching the pivotal mounting means directly to the hopper, as illustrated in the drawings. In the modification illustrated, projecting members 8 are welded or otherwise suitably attached to the conical bottom 2 of the hopper, to which members is attached an adjustable element 9, on which the chute 7 is pivotally mounted. Projecting members 10, affixed to the closed charging end of the chute 7, and equipped with a crossbar or yoke 11, provides suitable means for co-operating with the member 9 to secure pivotal mounting of the chute 7. The member 9 desirably comprises a turnbuckle, as illustrated in the drawings, in which case double pivotal mounting is secured by pivotally mounting the turnbuckle 9 on the crossbar or yoke 11, and also on a bolt, rivet, or other suitable pivoting means attached to the projecting member 8.

A clamping member 12 is provided for detachably mounting on the feed trough 13 of an ensilage cutter, or on a vibrating feeding member of some other feeding device. The member 12 may suitably comprise an upright bar 14 formed of strap iron or other suitable material, and equipped with a plurality of mounting holes 15, by means of which the discharge end of the trough 7 may be secured by a bolt 16. Suitable clamping means are provided for mounting the bar 14 in feeding relationship to the feed trough 13. The clamping means preferably constitute an arm 17 integrally attached to the bar 14, suitably curved to receive the usual bead 18 at the top of the side wall of the feeding trough 13. A thumbscrew 19, co-operating with the upright member 14 provides engagement with the side wall of the feed trough 13. Desirably two clamping members 12 are employed, one on either side of the chute 7, as illustrated in Figure II of the drawings.

As may be seen from the above description, an outstanding advantage of our device constitutes the fact that although the height of the feed trough 13 may vary to a considerable extent in existing types of forage cutters, such as ensilage cutters or hay choppers, the various adjustments which we have provided enable the operator to adjust the angle of the feed chute 7 and the spacing of the charging end of this chute from the discharge port 3 of the hopper, to secure the desired rate of flow of the material from the hopper into the feeding trough of the forage cutter.

Our hopper and feeder is particularly useful in dispensing relatively small amounts of food concentrates such as dry molasses concentrates or high vitamin concentrates into other animal foodstuffs such as silage. In the operation of our device in conjunction with an ensilage cutter, the clamping members 12 are affixed to the side of the feed trough of the ensilage cutter at the desired location, and the supporting standard of the hopper is then so positioned as to enable attachment of the discharge end of the feed chute 7 to the upright members 14 of the clamping devices 12. The hopper 1 is then positioned at the proper height on the upright members 4 by means of the clamping members 6 to secure the approximate angle desired for the feed chute 7. The hopper 1 is then filled with the dry comminuted material to be dispensed into the forage cutter, which latter is then placed in operation, and the vibration inherent in the operation of the forage cutter vibrates the feed chute 7 sufficiently to insure proper flow of the dry comminuted material. After the forage cutter is in operation, the valve 3 is opened to allow the material in the hopper 1 to flow onto the charging end of the feed chute 7. Final adjustments in the height of the charging and discharging ends of the chute 7 may then be made by means of the turnbuckle 9 and the bolts 16, whereby the angle of the chute 7, and the spacing of the charging end of the chute from the discharge port 3 of the hopper, may be fixed to secure any desired rate of flow.

It is to be understood, of course, that the particular modification illustrated in the drawings, and described above, does not limit the scope of our invention. Our invention is concerned with the co-operative relationship between the various elements, rather than with the particular physical form of these elements. Thus, various shapes of hoppers could be employed and various types of mounting standards could be provided in the place of those illustrated above. Similarly, other types of adjustable mounting means could be utilized. For example, the hopper could be mounted by means of bolts and a plurality of holes in the upright members of the supporting standard, and, vice versa, clamping means could be substituted for the bolts and plurality of holes employed in mounting the discharge end of the feed chute. Any such modifications, and the use of any equivalents which would naturally occur to those skilled in the art, are to be understood as included within the scope of our invention.

Our invention now having been described, what we claim is:

1. A hopper and feeding device for comminuted material, adapted to co-operate with a vibrating feeding member of a second feeding device to admix the said comminuted material with material passing through said second feeding device, comprising an open-top receptacle, an adjustable discharge opening in the bottom of said receptacle, a feed chute positioned below said discharge opening by means of a pivotal mounting member, and an attaching member adapted to be mounted on the vibrating feeding member of said second feeding device, said attaching member receiving its vibrations wholly from the vibrating feeding member of said second feeding device, said attaching member having mounting means for positioning the discharge end of said feed chute in feeding relationship to said vibrating feeding member of said second feeding device.

2. A hopper and feeding device for comminuted material adapted to co-operate with a vibrating feeding member of a second feeding device, to admix said comminuted material with material passing through a second feeding device, comprising an open-top hopper, a supporting standard, vertically adjustable mounting means for positioning said hopper on said standard, an adjustable discharge opening in the bottom of said hopper, a feed chute positioned below said discharge opening by means of a pivotal mounting member, said pivotal mounting member being adjustable to vary the vertical spacing of the charging end of said feed chute below the discharge opening of said hopper, and an attaching member adapted to be detachably mounted on the vibrating feeding member of said second feeding device, said attaching member having mounting means for positioning the discharge end of said feed chute in feeding relationship to said vibrating feed member of said feeding device.

3. A hopper and feeding device for dry comminuted animal foodstuffs adapted to cooperate with the vibrating feed trough of a forage cutter to admix said foodstuff with forage passing through the feed trough of said forage cutter, comprising an open-top cylindrical hopper having a conical bottom, a supporting standard, vertically adjustable mounting means for positioning said hopper on said standard, an adjustable discharge opening in the bottom of said hopper, a feed chute positioned below said discharge opening and attached to said hopper by means of a pivotal mounting member, said pivotal mounting member being adjustable to vary the vertical spacing of the charging end of said feed chute below the discharge opening of said hopper, and an attaching member adapted to be detachably mounted on the vibrating feed trough of said forage cutter, said attaching member having vertical adjustable mounting means for positioning the discharge end of said feed chute in feeding relationship to the feed trough of said forage cutter.

4. A hopper and feeding device for dry comminuted animal foodstuff, adapted to co-operate with the vibrating feed trough of an ensilage cutter to admix said comminuted foodstuff with ensilage passing through the feed trough of said ensilage cutter, comprising an open-top cylindrical hopper having a conical bottom, a supporting standard including angle-iron upright members, clamping members for attaching said hopper to said upright angle-iron members, an adjustable discharge opening in the bottom of said hopper, a feed chute positioned below said discharge opening and attached to said hopper by means of a pivotally mounted turnbuckle, and attaching members adapted to be detachably mounted on the feed trough of said ensilage cutter, said attaching members having vertically-spaced holes for the reception of bolts attached to the discharge end of said chute, for positioning the discharge end of said chute in feeding relationship to the feed trough of said ensilage cutter.

BENJAMIN H. TICKNOR, II.
ARNOLD M. TALBOTT.